April 30, 1935.    J. L. ANDERSON    1,999,855
TRACING DEVICE
Filed Oct. 26, 1933    2 Sheets-Sheet 1
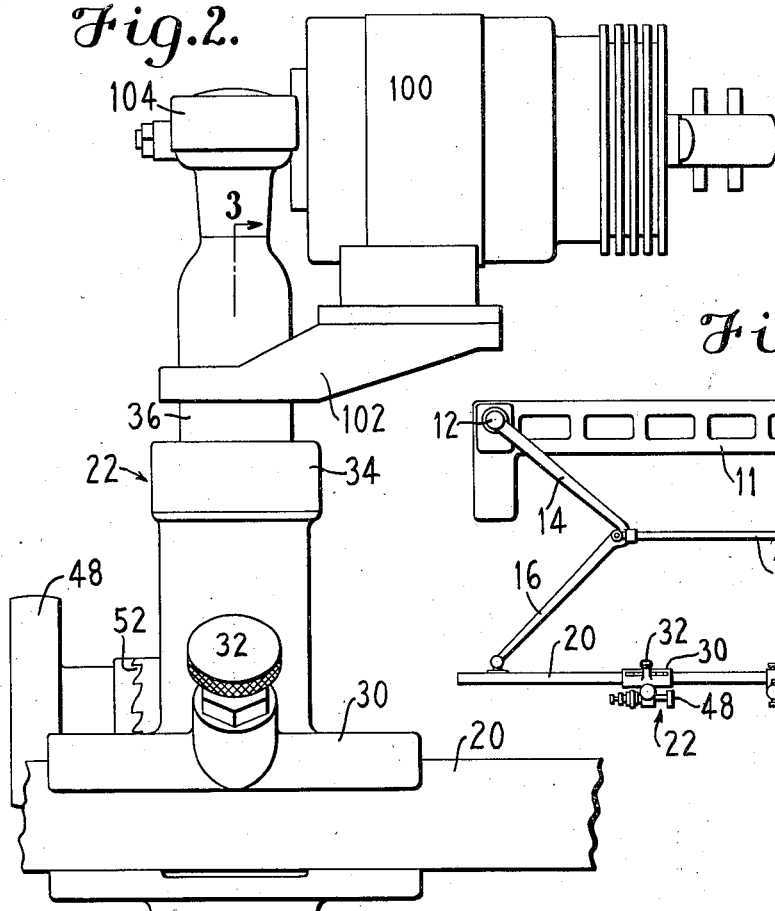
INVENTOR
James L. Anderson
BY J. F. Brandenburg
ATTORNEY April 30, 1935.  J. L. ANDERSON  1,999,855
TRACING DEVICE
Filed Oct. 26, 1933  2 Sheets-Sheet 2

INVENTOR
James L. Anderson
BY
J. F. Brandenburg
ATTORNEY

Patented Apr. 30, 1935

1,999,855

UNITED STATES PATENT OFFICE 1,999,855

TRACING DEVICE

James L. Anderson, Closter, N. J., assignor to Air Reduction Company, Incorporated, New York, N. Y., a corporation of New York Application October 26, 1933, Serial No. 695,316

11 Claims. (Cl. 33—23)

This invention relates to tracing devices for torch cutting or welding machines.

When a torch is to be guided from an outline of a drawing or print, it is common practice to move the torch supporting frame by a power driven tracer connected to the frame and having a traction wheel which runs on the drawing or print. This tracer wheel is swivelly supported so that it can be turned manually to roll in any and changing directions according to the outline of the drawing. The tracer wheel is driven through suitable reduction gearing by an electric motor.

Besides the swivel movement necessary for guiding the tracer, the wheel and its connected parts have some vertical movement so that the wheel can be lifted from the drawing. Tracers are usually designed so that they are free to move vertically or "float" while traveling across a drawing on a surface which is not perfectly smooth. This floating movement of the tracer prevents irregularities in the surface on which the tracer wheel rolls from being transmitted to the torch and changing the spacing of the torch from the work.

In order to obtain a cut which is an accurate reproduction of the outline followed by the tracer wheel, it is essential that there be no horizontal play in the tracer or its connections to the torch supporting frame on machines in which the plane of movement of the frame is horizontal, as is usually the case. The requirements for swivel movement about a vertical axis and for vertical floating movement, while at the same time insuring against any horizontal movement with respect to the frame, have resulted in tracer designs which are expensive to manufacture.

The speed of the tracer motor is kept substantially constant by a governor. It is necessary to maintain a uniform torch speed in order to make a smooth cut. Play or lost motion in the driving connections between the motor and the tracer wheel is highly objectionable because such lost motion permits some movement of the wheel independent of the motor. When a tracer having such lost motion is traveling along a straight line of a drawing with the motor driving the wheel at constant speed, an operator grasping the tracer to guide it as it approaches a turn often unconsciously pushes the tracer wheel ahead of the motor by the amount of the lost motion and causes a rough place in the cut, or even loses the cut entirely if the lost motion is very great. Another rough place results while the lost motion is again taken up. Even when the operator is not touching the tracer, vibration or irregularities in the supporting surface are often sufficient to cause the tracer to run ahead of the motor at times and move at an irregular rate when there is lost motion in the driving connections.

When the motor is located at the upper end of the tracer, the driving connections to the tracer wheel include a vertical shaft in line with the point of contact of the tracer wheel on the drawing. This vertical driving shaft is subject to end thrust and therefore acquires some end play as the result of bearing wear. Such end play is the most common cause of lost motion in the driving connections between the motor and tracer wheel in this type of tracer. There is some lost motion in the gearing, but this lost motion is limited by using accurately cut gears with very little backlash.

It is an object of this invention to provide an improved tracer having relatively few parts and having parts which can be manufactured and assembled with less machine work than the tracers of the prior art.

Another object of the invention is to provide a tracer, of the type having a vertical drive shaft, capable of long service without developing end play in its drive shaft, and to provide means for conveniently and effectively taking up such end play if it does develop.

Other objects are simplicity; compactness; accurate regulation of the friction opposing swivel movement; and resistance to injury from shock when the tracer is allowed to drop or is otherwise brought into abrupt contact with the drawing table.

Other objects, features and advantages of the invention will appear or be pointed out as the description proceeds.

In the accompanying drawings, forming part hereof:

Fig. 1 is a diagrammatic top plan view showing a universal cutting machine with a tracer embodying the invention;

Fig. 2 is a rear elevation, partly in section, of the tracer shown in Fig. 1;

Figure 3:
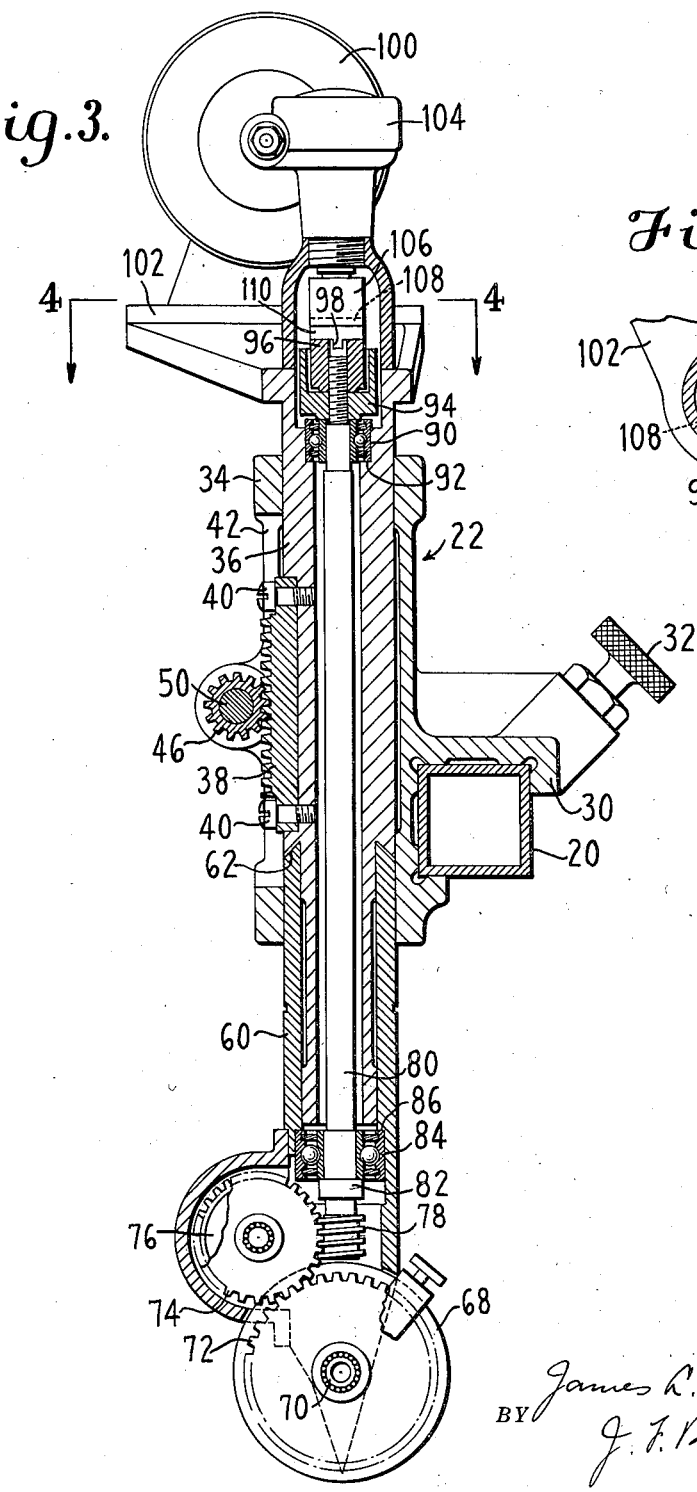
Fig. 3 is a side view of the tracer shown in Fig. 2, most of the parts being shown in section along the line 3—3 of Fig. 2.
Figure 4:
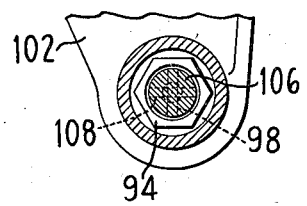
Fig. 4 is a section on the line 4—4 of Fig. 3.

The invention can be used with various types of cutting machines and is shown in Fig. 1 applied to a representative type of universal cutting machine. A base 11 has upstanding columns 12 on which arms 14 are pivoted. An arm 16 is pivotally connected with each of the arms 14.

The forward ends of the arms 14 are connected by the link or rod 18 and the forward ends of the arms 16 are pivotally connected with a front bar 20.

A tracer 22 and a torch 24 are carried by the front bar 20, which always moves parallel to itself and causes the torch to follow a path similar to that traveled by the tracer.

Referring to Figs. 2 and 3, a clamp fitting or bracket 30 is slidable along the bar 20 and can be held in any set position by a clamp screw 32. The clamp fitting or bracket 30 has a vertical tubular bearing 34. A sleeve 36 extends through this tubular bearing.

A rack 38 is fastened to the sleeve 36 by screws 40. This rack extends through a slot 42 in the front side of the tubular bearing 34 and serves as a key to prevent turning of the sleeve 36 in the tubular bearing. The rack 38 is shorter than the slot 42, so that the sleeve 36 can move vertically for a limited distance.

A pinion 46 meshes with the rack 38, and this pinion is connected to a hand-wheel 48 by a shaft 50. The hand-wheel 48 is rotated to operate the rack and pinion mechanism to raise and lower the sleeve 36 in the tubular bearing 34. The hand-wheel 48, shaft 50 and pinion 46 have limited axial movement to permit teeth 52 on the hand-wheel hub to engage with stationary teeth on the side of the tubular bearing to hold the sleeve 36 and other parts of the tracer in elevated position. When the tracer is to be lowered into contact with the drawing, the hand-wheel 48 is moved axially to disengage the teeth 52 so that it is free to turn and lower the sleeve 36.

The lower end of the sleeve 36 is of reduced diameter and a tracer holder 60 fits over this lower end as a bearing. The upper end of the tracer holder 60 has a sloping annular face which contacts with an under-cut shoulder 62 on the sleeve 36, as shown in Fig. 3. An important advantage of this construction is that any sharp upward blow against the tracer holder 60, such as results when the tracer is allowed to fall heavily on the drawing or drawing table, does not tend to spread or flare the top end of the tracer holder, such as is the case when the end of the tracer holder is fitted over a tapered bearing. Such distortion of the tracer holder causes it to bind during swivel movement, or the distortion may be serious enough to prevent swivel movement of the holder. The only outward component of the pressure between the tracer holder 60 and the under-cut shoulder 62 is against the shoulder. The sleeve 36 is of ample section in the region of the shoulder to prevent any outward flaring, or other distortion of the shoulder 62 by any force transmitted upward through the swivel portion of the tracer against the sloping bearing surface of the shoulder 62.

The lower end of the tracer holder 60 has side members 66. A tracer wheel 68 runs on a horizontal axle 70 extending through these side members 66. A gear 72 is rigidly connected with the tracer wheel 68 and meshes with a gear 74 driven from a worm-wheel 76. The worm-wheel 76 is driven by a worm gear 78 secured to the lower end of a vertical shaft 80.

Another advantage of the sloping bearing against the shoulder 62 is that it provides an extensive friction area for resisting swivel movement of the tracer holder. It is important to have sufficient friction in the bearings on which the tracer holder swivels to prevent the friction of the worm gear 78 on the worm-wheel from spinning the tracer holder around the axis of the shaft 80.

The lower end of the vertical shaft 80 has a collar 82 supporting a ball bearing 84, in which the vertical shaft runs. The ball bearing 84 fits within the tracer holder 60 and abuts against a shoulder 86 to support the tracer holder and to keep its upper end in contact with the under-cut shoulder 62. The vertical shaft 80 thus holds the tracer in assembled relation.

The upper end of the vertical shaft 80 turns in a ball bearing 90, which fits within the upper end of the sleeve 36 and is held against downward movement by a shoulder 92. A hexagonal nut 94 is threaded on the end of the vertical shaft 80 and abuts against the ball bearing 90. End play in the vertical shaft 80 is taken up by turning the hexagonal nut 94 so that it raises the vertical shaft 80 until the tracer holder 60 is in contact with under-cut shoulder 62.

The hexagonal nut 94 is held in any set position by a lock nut 96. This lock nut is substantially cylindrical and fits within a recess in the hexagonal nut 94. The lock nut 96 has a slot 98 in its top face.

Vertical shaft 80 is driven by a motor 100, which is supported on a platform 102. This platform is integral or connected with the upper end of the sleeve 36. The motor 100 drives worm reduction gearing 104, to which is connected a coupling member 106 in alignment with the vertical shaft 80.

The lower end of the coupling member 106 is slotted to receive a tongue 108 of an intermediate coupling member 110. A tongue on the bottom side of the intermediate coupling member 110 fits into the slot 98 so that the lock nut 96 comprises the bottom member of the coupling.

The ball bearings 84 and 90 serve both as thrust bearings and as shaft bearings for the vertical shaft 80. The end thrust of the worm gear 78 is taken by the ball bearing 84 or 90, depending on the direction of rotation of the worm.

Any end play in this vertical shaft 80 is objectionable because it permits lost motion between the tracer wheel 68 and the motor 100, and such lost motion permits the tracer to move forward whenever the lost motion is taken up, thus causing a rough place in the cut or in extreme cases losing the cut. This invention permits any end play which develops in the vertical shaft 80 to be quickly and easily taken up. The motor 100, reduction gear 104 and coupling members 106 and 110 are removed as a unit, the lock nut 96 is backed off to permit the hexagonal nut 94 to turn, the hexagonal nut 94 is rotated on the vertical shaft 80 sufficiently to take up the end play, the lock nut 96 is again clamped against the hexagonal nut 94 to lock it in its new position, and the motor 100 and its connected parts are then replaced.

The screw adjustment provided by the hexagonal nut 94 makes it possible to regulate the vertical position of the drive shaft with great accuracy. It is thus possible to not only take up all end play in the vertical shaft 80, but the hexagonal nut 94 can be turned slightly further to produce pressure between the top of the tracer holder and the under-cut shoulder 62. This pressure can be regulated to obtain as much friction as necessary to prevent the worm gear from spinning the tracer holder about the axis of the shaft 80.

Terms of orientation used in the description and claims are relative and the positions of parts can be changed and other modifications made in the illustrated embodiment of the invention, and some features of the invention can be used alone or in combination with other features without departing from the invention defined in the claims.

I claim:

1. A tracing device comprising a tracer wheel supported for rotation about a horizontal axis; a motor at the upper end of the tracing device; driving connections between the motor and the tracer wheel including a vertical shaft, and means for taking up end play in the vertical shaft, said means including a member threaded on the vertical shaft for movement along said vertical shaft, and locking means for holding said member in any set position.

2. In a tracing device, a tracer wheel swivelly supported at the lower end of the tracing device; a drive shaft with its axis in line with the point of traction of the said wheel; gearing between the drive shaft and tracer wheel, said gearing exerting an end thrust on the drive shaft when in operation; a thrust bearing for the drive shaft; and a member threaded on the shaft for holding the shaft firmly against the thrust bearing and movable along its threads to take up end play in said shaft.

3. A tracing device comprising a tracer wheel for running on a drawing or other pattern; a drive shaft with its axis in line with the point of contact of the wheel on the pattern; gearing between the wheel and drive shaft, including a worm gear on the drive shaft; a bearing for taking the end thrust of the worm gear; a member threaded on the drive shaft and operable to take up any end play which develops in the drive shaft; and means for locking the threaded member in any set position to hold the thrust bearing under the desired degree of pressure.

4. In a tracing device having a tracer-wheel drive shaft extending at right angles to the axis of the tracer wheel and driving connections between the shaft and wheel, screw threads on a portion of the drive shaft; a thrust bearing; a member threaded on the shaft and abutting against the thrust bearing to prevent end play in the drive shaft; and a lock nut threaded on the shaft adjacent said member for holding said member in any set position.

5. In a tracing device having a tracer-wheel drive shaft extending at right angles to the axis of the tracer wheel and driving connections between the shaft and wheel, screw threads on the upper end of the drive shaft; a thrust bearing; a nut on the upper end of the shaft in abutment with the thrust bearing for preventing end play in the drive shaft; a coupling in line with the drive shaft for connecting said drive shaft with an electric motor at the top of the tracer, said coupling including a part threaded on the upper end of the drive shaft adjacent said nut and serving as a lock nut to hold said nut in any set position.

6. A tracing device comprising a sleeve; an under-cut shoulder on the outside of the sleeve; a tracer holder fitting over the lower end of the sleeve below said shoulder; a tapered face on the upper end of the tracer holder bearing against the under-cut shoulder as a bearing; means holding the tracer holder in bearing contact with said shoulder for swivel movement on the sleeve; a traction wheel connected with the tracer holder; and mechanism for driving the tracer and wheel.

7. In a tracing device, a tracer holder at the lower end of the tracing device; a shoulder in the tracer holder; a ball bearing located below the shoulder in the tracer holder; a vertical drive shaft extending through the ball bearing; and a shoulder on the drive shaft, below the ball bearing, thrusting against said ball bearing to hold it against the shoulder in the tracer holder, and maintaining said tracer holder in assembled relation with the other parts of the tracing device.

8. A tracer comprising a sleeve; a tracer holder bearing against the lower portion of the sleeve for swivel movement with respect to said sleeve; a shoulder in the tracer holder; a ball bearing located below the shoulder in the tracer holder; a vertical drive shaft extending through the ball bearing; a shoulder on the drive shaft below the ball bearing and thrusting against said ball bearing to hold it against the shoulder in the tracer holder and to maintain said tracer holder in assembled relation with the sleeve; a ball bearing in the sleeve near the upper end of the shaft; and means for holding the shaft against downward movement.

9. A tracer comprising a sleeve; a tracer holder bearing against the lower portion of the sleeve for swivel movement with respect to said sleeve; a shoulder in the tracer holder; a ball bearing located below the shoulder in the tracer holder; a vertical drive shaft extending through the ball bearing; a shoulder on the drive shaft below the ball bearing and thrusting against said ball bearing to hold it against the shoulder in the tracer holder and to maintain said tracer holder in assembled relation with the sleeve; a ball bearing above a shoulder in the sleeve near the upper end of the shaft; a nut threaded on the upper end of the shaft with its bottom face thrusting against the adjacent ball bearing; and a lock nut for holding the first nut in any set position.

10. In a tracing device for a universal torch machine, a non-swivel portion, a motor connected to the non-swivel portion, a tracer wheel, a holder for the wheel bearing against the non-swivel portion of the tracing device and rotatable on said non-swivel portion to steer the tracer wheel along a course, a shaft retaining the wheel holder and the non-swivel portion of the tracing device in assembled relation, driving connections through which the motor rotates said shaft, and gearing for transmitting rotation of the shaft to the tracer wheel.

11. In a tracing device of the type having a tracer wheel connected with a swivel holder, a motor, and power-transmitting connections between the motor and the tracer wheel, a drive shaft in said power-transmitting connections, and bearings through which the swivel holder and other parts of the tracing device are held in assembled relation by said drive shaft exclusively.

JAMES L. ANDERSON.